(12) United States Patent
Mitchell et al.

(10) Patent No.: US 10,197,282 B2
(45) Date of Patent: Feb. 5, 2019

(54) MULTISTAGED LEAN PREVAPORIZING PREMIXING FUEL INJECTOR

(71) Applicant: Capstone Turbine Corporation, Chatsworth, CA (US)

(72) Inventors: Mark G. Mitchell, Duarte, CA (US); Junhua Chen, Irvine, CA (US)

(73) Assignee: Capstone Turbine Corporation, Chatsworth, CA (US)

( * ) Notice: Subject to any disclaimer, the term of this patent is extended or adjusted under 35 U.S.C. 154(b) by 171 days.

(21) Appl. No.: 15/158,654

(22) Filed: May 19, 2016

(65) Prior Publication Data

US 2016/0258630 A1 Sep. 8, 2016

Related U.S. Application Data

(62) Division of application No. 13/473,814, filed on May 17, 2012, now Pat. No. 9,366,432.

(51) Int. Cl.
*F23R 3/28* (2006.01)
*F23L 15/04* (2006.01)
(Continued)

(52) U.S. Cl.
CPC ............... *F23R 3/286* (2013.01); *F02C 3/22* (2013.01); *F02C 3/24* (2013.01); *F23D 11/402* (2013.01); *F23D 11/408* (2013.01); *F23D 11/441* (2013.01); *F23D 17/002* (2013.01); *F23L 15/04* (2013.01); *F23R 3/32* (2013.01); *F23R 3/343* (2013.01); *F23R 3/36* (2013.01); *Y02E 20/348* (2013.01); *Y10T 137/87587* (2015.04)

(58) Field of Classification Search
CPC .. F23R 3/286; F23R 3/343; F23R 3/36; F23R 3/32; F23R 3/30; F02C 3/24; F23D 11/441
See application file for complete search history.

(56) References Cited

U.S. PATENT DOCUMENTS 3,070,317 A 12/1962 Hunter et al.
3,739,989 A 6/1973 Vosper
(Continued)

FOREIGN PATENT DOCUMENTS

DE 10164097 A1 7/2003
EP 0671590 A1 9/1995
GB 2073399 A 10/1981

OTHER PUBLICATIONS

International Search Report in corresponding International Application No. PCT/US2013/040312, dated Mar. 17, 2014, 4 pp. (not prior art).

*Primary Examiner* — Ted Kim
(74) *Attorney, Agent, or Firm* — Lucian Wayne Beavers; Patterson Intellectual Property Law, PC

(57) ABSTRACT

A multistaged lean prevaporizing premixing fuel injector apparatus is provided. The fuel injector may be utilized with a turbogenerator. Preheated combustion air from the turbogenerator's recuperator may be utilized by the fuel injector to prevaporize liquid fuel. The injector may provide for premixing of multiple fuel streams and include multiple stages with a flow distributor plate separating adjacent stages. The injector may include multiple stages, with a pilot tube located in a final stage splitting the fuel stream into a premixed pilot stream and a premixed final fuel and air mixture stream.

12 Claims, 8 Drawing Sheets

(51) Int. Cl.
  *F23R 3/32*    (2006.01)
  *F23R 3/36*    (2006.01)
  *F23D 11/40*   (2006.01)
  *F23D 11/44*   (2006.01)
  *F23D 17/00*   (2006.01)
  *F02C 3/22*    (2006.01)
  *F02C 3/24*    (2006.01)
  *F23R 3/34*    (2006.01)

(56) References Cited

U.S. PATENT DOCUMENTS

| | | | |
|---|---|---|---|
| 3,866,413 A * | 2/1975 | Sturgess | F23R 3/36 60/748 |
| 4,463,568 A | 8/1984 | Willis et al. | |
| 5,062,792 A | 11/1991 | Maghon | |
| 5,319,923 A | 6/1994 | Leonard et al. | |
| 5,359,847 A | 11/1994 | Pillsbury et al. | |
| 5,408,825 A | 4/1995 | Foss et al. | |
| 5,592,819 A | 1/1997 | Ansart et al. | |
| 5,816,049 A | 10/1998 | Joshi | |
| 5,894,720 A | 4/1999 | Willis et al. | |
| 5,966,926 A | 10/1999 | Shekleton et al. | |
| 6,016,658 A | 1/2000 | Willis et al. | |
| 6,174,160 B1 | 1/2001 | Lee et al. | |
| 6,178,751 B1 | 1/2001 | Shekleton et al. | |
| 6,298,667 B1 | 10/2001 | Glynn et al. | |
| 6,311,473 B1 | 11/2001 | Benjamin et al. | |
| 6,350,116 B1 | 2/2002 | Herrmann | |
| 6,405,522 B1 | 6/2002 | Pont et al. | |
| 6,639,328 B2 | 10/2003 | Wacknov | |
| 6,675,583 B2 | 1/2004 | Willis et al. | |
| 6,804,946 B2 | 10/2004 | Willis et al. | |
| 6,981,358 B2 | 1/2006 | Bellucci et al. | |
| 7,090,205 B2 | 8/2006 | Oda et al. | |
| 7,610,759 B2 | 11/2009 | Yoshida et al. | |
| 2002/0026796 A1 | 3/2002 | Gutmark et al. | |
| 2003/0031972 A1 | 2/2003 | Griffin et al. | |
| 2005/0198966 A1 | 9/2005 | Boardman | |
| 2011/0113783 A1 | 5/2011 | Boardman et al. | |

* cited by examiner

MULTISTAGED LEAN PREVAPORIZING PREMIXING FUEL INJECTOR

This application is a divisional of Ser. No. 13/473,814, filed May 17, 2012, now U.S. Pat. No. 9,366,432.

BACKGROUND OF THE INVENTION

1. Field of the Invention

The present invention relates generally to the field of multistaged lean prevaporizing premixing fuel injectors, and more particularly to an improved low emissions combustion system for a gas turbine engine using such injectors.

2. Description of the Prior Art

In a gas turbine engine, inlet air is continuously compressed, mixed with fuel in an inflammable proportion, and then contacted with an ignition source to ignite the mixture which will then continue to burn. The heat energy thus released then flows in the combustion gases to a turbine where it is converted to rotary energy for driving equipment such as an electrical generator. The combustion gases are then exhausted to atmosphere after giving up some of their remaining heat in a recuperator to the incoming air provided from the compressor.

Quantities of air greatly in excess of stoichiometric amounts are normally compressed and utilized to keep the combustor liner cool and dilute the combustor exhaust gases so as to avoid damage to the turbine nozzle and blades. Generally, primary sections of the combustor are operated near stoichiometric conditions which produce combustor gas temperatures up to approximately four thousand (4,000) degrees Fahrenheit. Further along the combustor, secondary air is admitted which raises the air-fuel ratio and lowers the gas temperatures so that the gases exiting the combustor are in the range of two thousand (2,000) degrees Fahrenheit.

It is well established that NOx formation is thermodynamically favored at high temperatures. Since the NOx formation reaction is so highly temperature dependent, decreasing the peak combustion temperature can provide an effective means of reducing NOx emissions from gas turbine engines as can limiting the residence time of the combustion products in the combustion zone. Operating the combustion process in a very lean condition (i.e., high excess air) is one of the simplest ways of achieving lower temperatures and hence lower NOx emissions. Very lean ignition and combustion, however, inevitably result in incomplete combustion and the attendant emissions which result therefrom. In addition, combustion processes cannot be sustained at these extremely lean operating conditions.

Examples of prior lean premixed fuel injectors for gas turbine engines are shown in U.S. Pat. No. 5,894,720 to Willis et al. and U.S. Pat. No. 6,016,658 to Willis et al., both of which are assigned to the assignee of the present invention.

It has also been proposed to utilize a staged prevaporized premixed fuel injector for turbine engines as shown in U.S. Pat. No. 6,174,160 to Lee et al.

Another prior art injector 300 is shown schematically in FIG. 9. Inner and outer tubular walls 302 and 304 define an air supply passage 306 therebetween. Heated exhaust air from a microturbine recuperator 308 is provided to the air supply passage 306. A liquid fuel injection nozzle 310 is located centrally within the inner tubular wall 302 and receives liquid fuel through a liquid fuel supply passage 312 and atomization air through atomization air supply passage 314. Upstream and downstream air inlets 316 and 318, respectively, are provided through the inner tubular wall 302 upstream and downstream of the liquid fuel nozzle 310. An air distributor 320 extends from the liquid fuel nozzle 310 to the inner tubular wall 302 and has a plurality of air passages 322 therethrough. A plurality of swirling slots 324 provide further communication of air from air supply passage 306 to the interior of inner tubular wall 302. The injector 300 has an outlet end 326 communicated with a combustion chamber 328 of the microturbine.

Thus, lean premixed combustion, both for liquid and gaseous fuels, has gained more popularity in order to achieve low NOx emissions in advanced combustion systems. On the other hand, due to fuel flexibility requirements, combustors are required to be more tolerant to fuel composition changes, which lean premixed combustors are sensitive to. Lean prevaporized premixed injector systems coupled with fuel composition changes are more subject to problems such as combustion instability, flashback and auto ignition.

SUMMARY OF THE INVENTION

A multistaged lean prevaporizing premixing dual fuel injector is provided, particularly for use in a low emission combustion system of a microturbine. Particularly when using such injectors with liquid fuel, the fuel and air preparation process to finely atomize, fully vaporize the liquid fuel and then fully mix the fuel with combustion air prior to the onset of the combustion process is important to achieve low emissions, especially for NOx levels below 9 ppmv (parts per million by volume) (at 15% $O_2$) emission levels.

A multistaged lean prevaporizing premixed dual fuel injector is disclosed which can be used to burn liquid fuel and more than one gaseous fuel at the same time. High temperature air is used to provide energy for vaporizing the atomized liquid fuel droplets. In an embodiment, the high temperature may be provided from the same source as the combustion air for the microturbine, which is the heated incoming air from the recuperator. The air temperature for the preheated combustion air coming from the recuperator may be in the range of from about 900° F. to about 1300° F. The use of preheated combustion air from the recuperator as the vaporizing air for the fuel injector greatly reduces system complexity and improves system reliability.

The fuel injector delivers a fuel and air mixture to the downstream combustion chamber with a desired level of fuel and air mixing, and with a fuel and air ratio distribution at the injector exit such that stable combustion and low NOx emission is achieved without issues such as liquid fuel coking, flashback or autoignition inside the injector. This fuel injector apparatus prepares the fuel and air mixture so that low emission combustion occurs in the downstream combustion chamber of the microturbine. The fuel injectors as disclosed may be used in gas turbines, particularly microturbines, and in other types of combustion systems. The disclosed fuel injectors may use single or multiple fuel types.

In one embodiment a multistaged lean prevaporizing premixing fuel injector apparatus for mixing multiple fuels includes a preliminary prevaporizing premixing chamber having a central longitudinal axis and having an inlet end. A preliminary air inlet introduces air into the preliminary prevaporizing premixing chamber. A final prevaporizing premixing chamber is downstream of the preliminary prevaporizing premixing chamber, and has a final air inlet for introducing air into the final prevaporizing premixing chamber. The final prevaporizing premixing chamber has an outlet end. A liquid fuel nozzle is arranged to project a spray of a liquid first fuel into the preliminary prevaporizing premixing chamber. A second fuel inlet is communicated with the preliminary prevaporizing premixing chamber for introducing a second fuel into the preliminary prevaporizing premixing chamber. A common air supply passage communicates a common combustion air source to both the preliminary air inlet and the final air inlet at substantially the same temperature. A final flow distributor is located upstream of the final prevaporizing premixing chamber for distributing a fuel-air mixture of the first and second fuels and air across a cross section of the final prevaporizing premixing chamber.

In another embodiment a multistaged lean prevaporizing premixing fuel injector apparatus includes a preliminary prevaporizing premixing chamber and a final prevaporizing premixing chamber. The preliminary prevaporizing premixing chamber has a central longitudinal axis and has an inlet end. A preliminary air inlet introduces air into the prevaporizing premixing chamber transversely to the longitudinal axis. The final prevaporizing premixing chamber is downstream of the preliminary prevaporizing premixing chamber, and has a final air inlet for introducing air into the final prevaporizing premixing chamber. The final prevaporizing premixing chamber has an outlet end. A liquid fuel nozzle is arranged to project a spray of liquid fuel into the preliminary prevaporizing premixing chamber upstream of the preliminary air inlet. A common air supply passage is provided for communicating a common combustion air source to both the preliminary air inlet and the final air inlet at substantially the same temperature.

In another embodiment a multistaged lean prevaporizing premixing fuel injector apparatus includes a preliminary prevaporizing premixing chamber having an injector inlet end and having a central longitudinal axis, and the fuel injector apparatus includes a final premixing chamber downstream of the preliminary prevaporizing premixing chamber and having an injector outlet end. A pilot tube is located in the final premixing chamber for diverting a pilot stream portion of a fuel and air mixture from the preliminary prevaporizing premixing chamber to the injector outlet end. The pilot tube includes a pilot tube inlet and a pilot tube outlet. A liquid fuel nozzle is arranged to spray a liquid fuel into the preliminary prevaporizing premixing chamber and toward the final premixing chamber. A preliminary air inlet is communicated with the preliminary prevaporizing premixing chamber for communicating preliminary combustion air to the preliminary prevaporizing premixing chamber. A final air inlet is communicated with the final premixing chamber for communicating final combustion air to the final premixing chamber. The final air inlet is located downstream of the pilot tube inlet so that a fuel and air mixture exiting from the pilot tube has a higher fuel to air ratio than does a fuel and air mixture exiting the final premixing chamber.

Numerous objects, features and advantages of the present invention will be readily apparent to those skilled in the art upon a reading of the following disclosure when taken in conjunction with the accompanying drawings.

DETAILED DESCRIPTION

Figure 1:
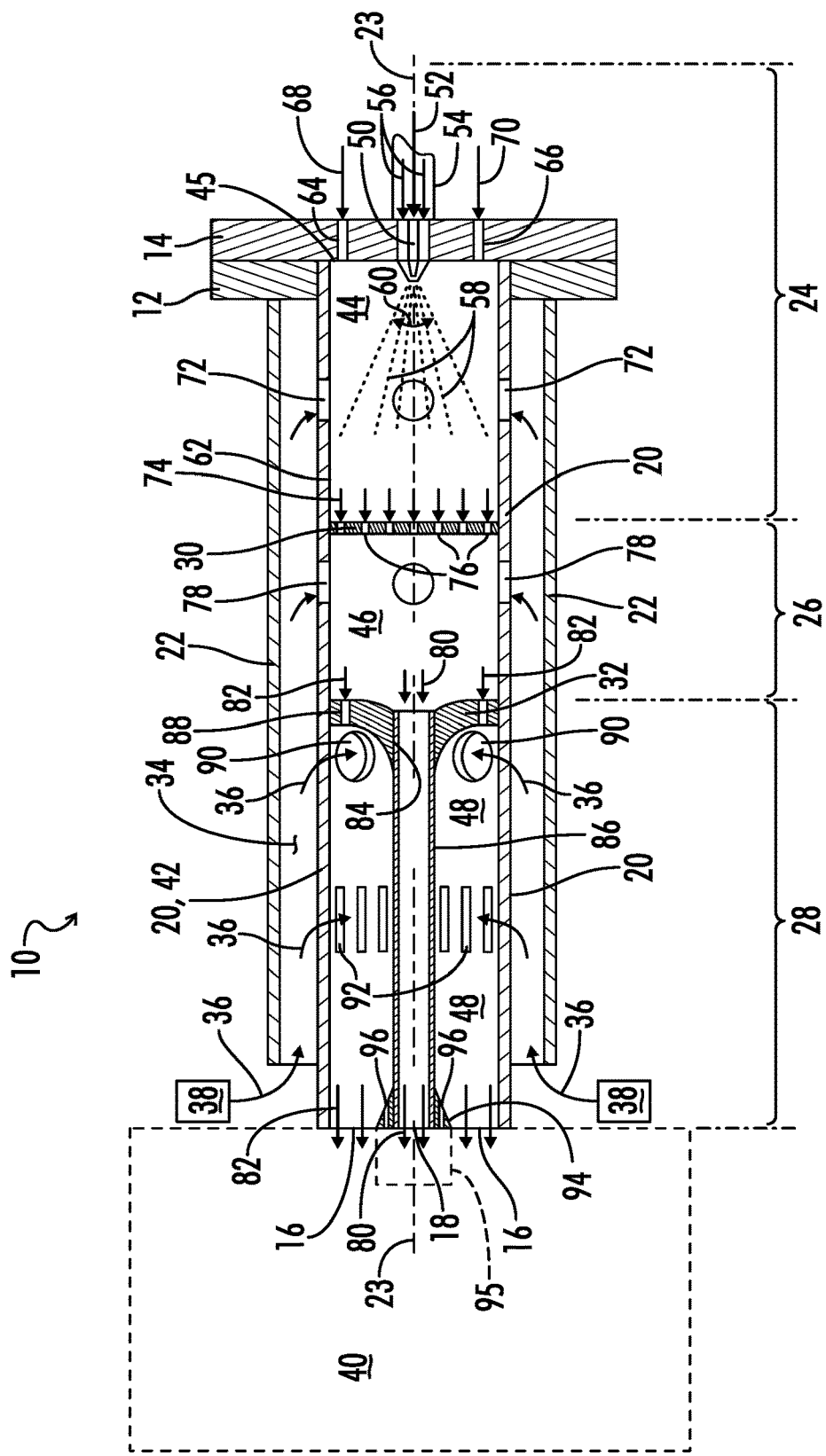
FIG. 1 is a schematic sectioned view of a multistaged prevaporizing premixing dual fuel injector.

Referring now to FIG. 1 a fuel injector is shown and generally designated by the numeral 10. The fuel injector 10 is shown somewhat schematically in FIG. 1. Although the general geometry of the injector 10 may vary, in one embodiment the injector 10 is a modularized tubular design with mounting flanges 12 and 14 on one end, and outlets 16 and 18 on the other end. In between is the injector body which includes inner and outer concentric tubes 20 and 22. In the embodiment illustrated the fuel injector apparatus 10 has a central longitudinal axis 23.

As is further explained below with regard to the embodiment of FIG. 6, the outer tube 22 may be an angled injector mounting tube 158 extending through the annular recuperator 123 of a turbogenerator, and the flange 12 may be a mounting boss 156 located on an outer recuperator wall 157. The inner tube 20 in turn may be a fuel injector tube 161 and the flange 14 may be an angled fuel injector flange 155 complementary to the mounting boss 12, 156.

The outlets 16 and 18 may be described as a final premixing chamber outlet 16 and a pilot tube outlet 18.

The inner and outer tubes 20 and 22 and flanges 12 and 14 may be constructed of high temperature resistant metal, or other suitable materials.

Figure 7:
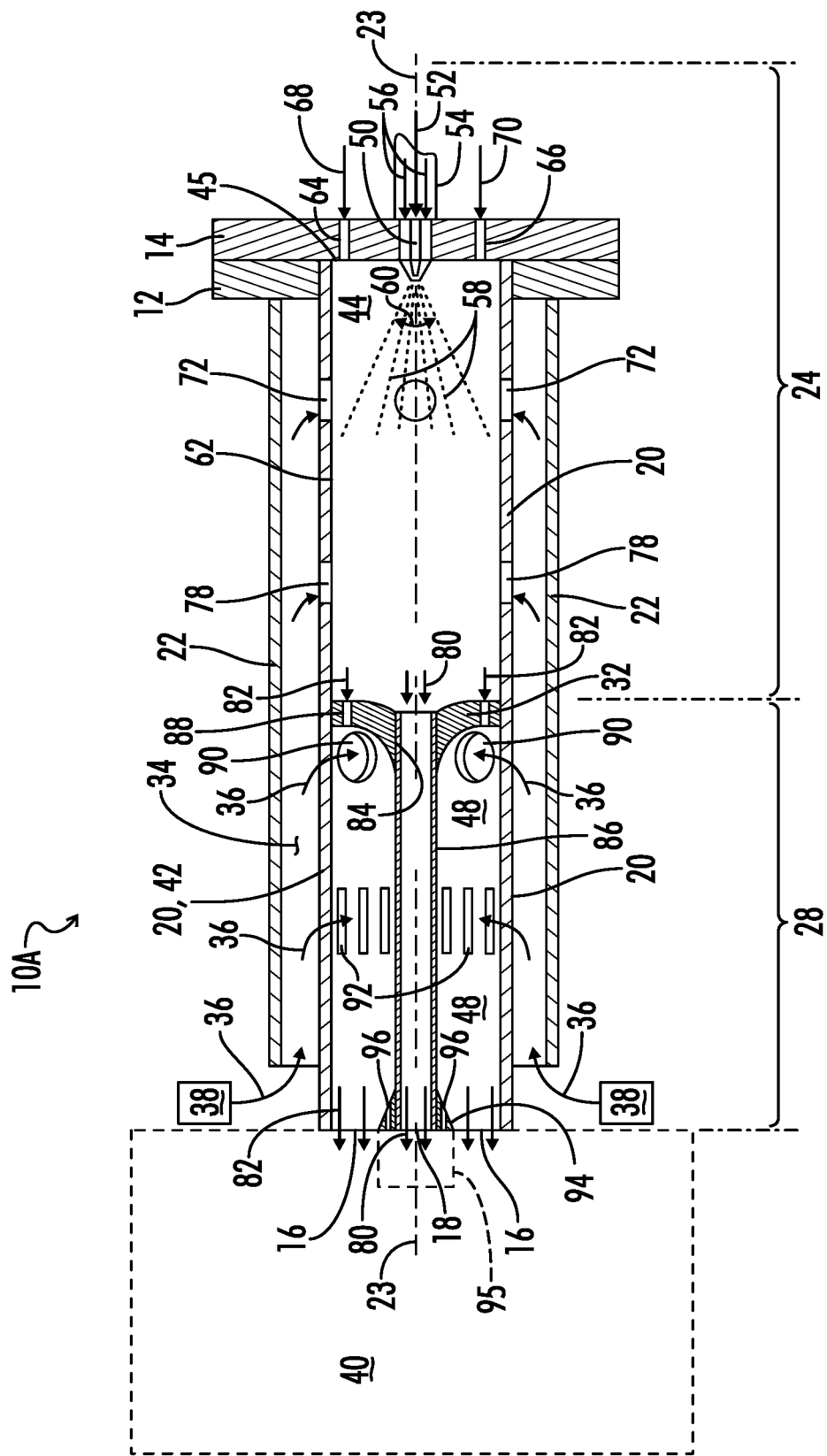
FIG. 7 is a schematic sectioned view similar to FIG. 1 and showing an alternative embodiment of the multistaged prevaporizing premixing dual fuel injector.
Figure 8:
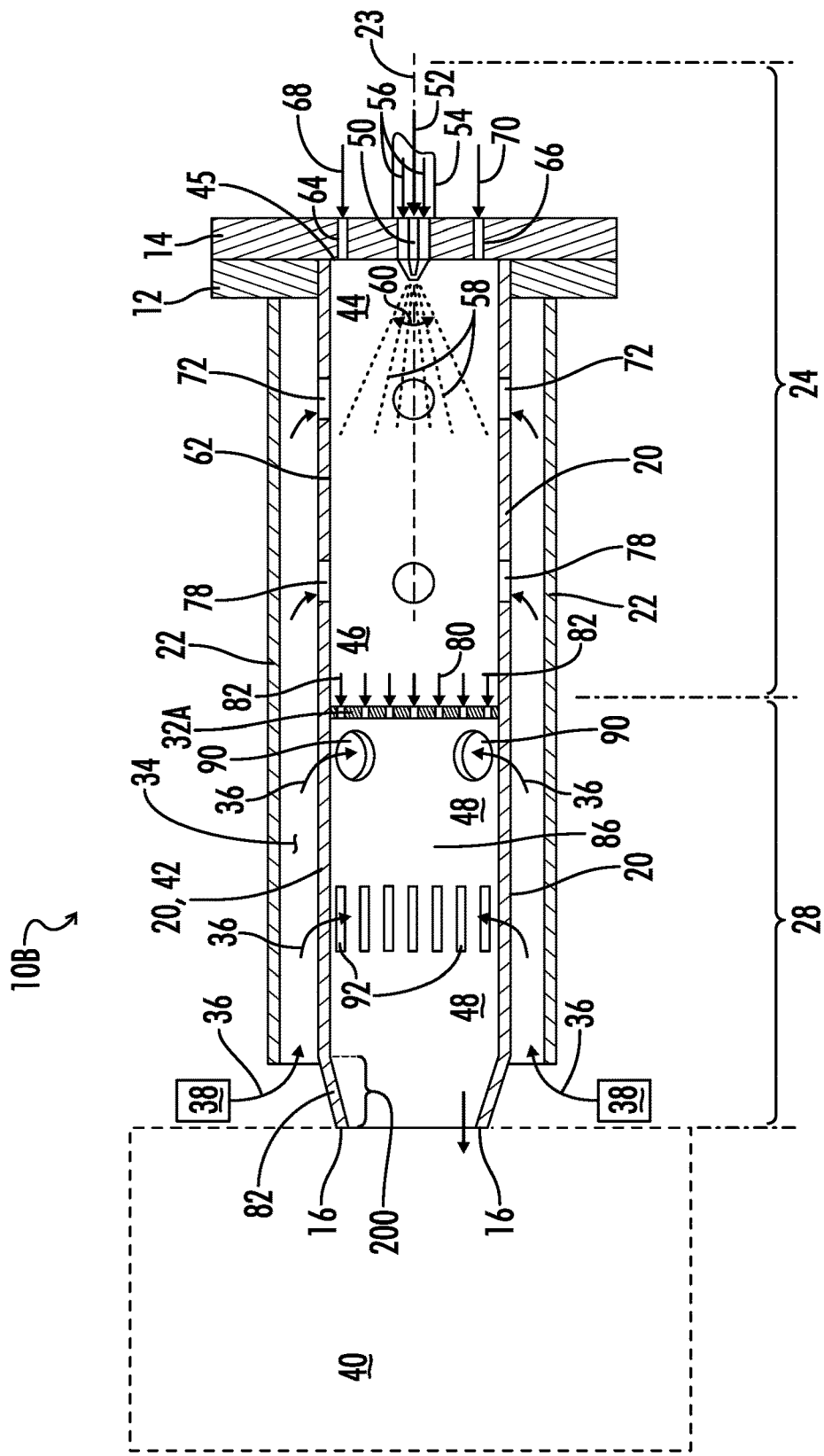
FIG. 8 is a schematic sectioned view similar to FIG. 1 and showing another alternative embodiment of the multistaged prevaporizing premixing dual fuel injector.
Figure 9:
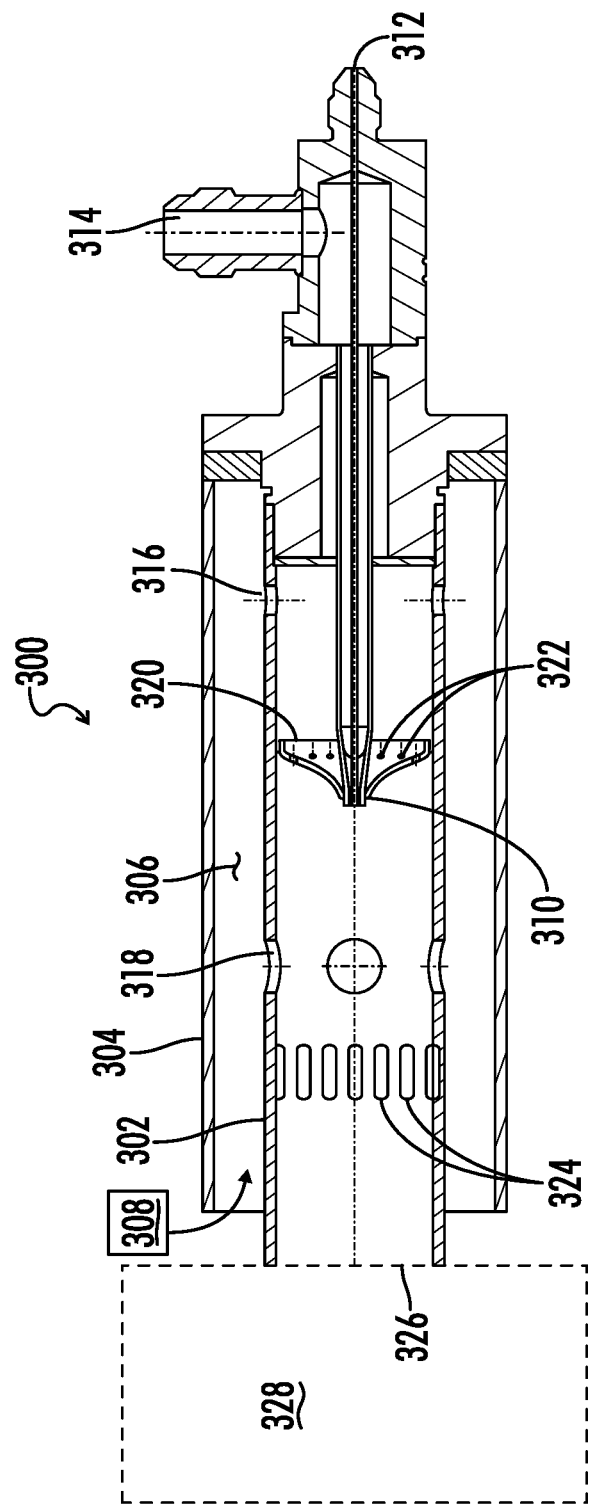
FIG. 9 is a schematic sectioned view of a prior art fuel injector.

In the embodiment illustrated in FIG. 1, the fuel injector 10 may include three stages of fuel and air prevaporizing and premixing, namely a preliminary prevaporizing and premixing stage 24, an intermediate prevaporizing and premixing stage 26, and a final prevaporizing and premixing stage 28. As is further described below, in some embodiments the intermediate prevaporizing and premixing stage 26 may be eliminated if sufficient prevaporization and premixing is achieved in the preliminary prevaporizing and premixing stage 24. For example, FIGS. 7 and 8 illustrate embodiments in which the intermediate prevaporizing and premixing stage 26 has been eliminated.

A first flow distributor 30 is shown between the preliminary and intermediate prevaporizing and premixing stages. A second flow distributor 32 is shown between the intermediate and final prevaporizing and premixing stages. If the design of the injector 10 is such that the required air and fuel mixing and flow patterns are otherwise provided, the flow distributor 30 may be eliminated, as seen for example in the embodiments of FIGS. 7 and 8.

An annular common combustion air supply passage 34 is defined between the inner and outer tubes 20 and 22. Combustion air 36 enters the combustion air supply passage 34 from a common combustion air source 38 and is provided via the combustion air supply passage 34 to the various stages of the fuel injector 10.

In an embodiment, the common combustion air source 38 may be a supply of preheated compressed air coming from the recuperator of a turbogenerator as is further described below with regard to FIGS. 2-6. Such preheated compressed air from the recuperator may be provided at a temperature in the range of from about 900° F. to about 1300° F. More generally the combustion air may be described as being at a temperature above about 900° F.

It will be understood that the temperature ranges described above for preheated compressed air from the recuperator are referring to the steady state temperature ranges generally achieved after the microturbine has reached its normal operating state. It will be understood that on start up of the microturbine the incoming air will be at ambient temperatures of the outside air at the location of the microturbine. Thus on start up, the compressed air exiting the recuperator may be at much lower temperatures for a short period of time until the microturbine comes up to operating temperature. Furthermore, it will be understood that for some turbine designs it is conceivable that the temperature of the preheated compressed air exiting the recuperator could exceed the 1300° F. value.

The combustion air 36 from source 38 provides both the energy for liquid fuel vaporization and the shear forces for mixing of vaporized fuel and air at the various stages of the injector 10.

The fuel and air mixture from the injector 10 exits via outlets 16 and 18 to a combustion chamber 40 at the desired levels of prevaporization and premixing, and with a desired velocity pattern, which will depend on many factors, including but not limited to, fuel composition, operating conditions, and combustion chamber geometry among others. In an embodiment as further described with regard to FIGS. 2-6 below, the combustion chamber 40 may be an annular combustion chamber of a turbogenerator.

The inner tube 20 may be described as having an annular chamber wall 42 which defines within the tube 20 a preliminary prevaporizing premixing chamber 44 associated with the preliminary prevaporizing and premixing stage 24, an intermediate prevaporizing premixing chamber 46 associated with the intermediate prevaporizing and premixing stage 26, and a final prevaporizing premixing chamber 48 associated with the final prevaporizing and premixing stage 28.

It is noted that the term "annular" as used herein is not limited to a circular shape, but may include other cross-sectional shapes such as for example a square cross-section tube or any polygonal shape tube.

The preliminary prevaporizing and premixing stage 24 of fuel injector 10 includes a liquid fuel atomization nozzle 50 projecting into an inlet end 45 of preliminary prevaporizing premixing chamber 44. Nozzle 50 may be a pressure atomizer, an air blast nozzle, an air assist nozzle, a film atomizer nozzle, a rotary atomizer nozzle, or any other type of atomizer or nozzle with reasonable atomizing quality. It is preferred to utilize a nozzle 50 having relatively fine atomization characteristics. The example of nozzle 50 illustrated in FIG. 1 is an air-assist/air-blast liquid atomizer 50. A liquid fuel supply conduit 52 supplies liquid fuel to nozzle 50. The liquid fuel may for example be number 2 diesel fuel. A concentric atomization air supply tube 54 concentrically disposed about liquid fuel supply conduit 52 provides atomization air 56 to nozzle 50. The shear forces between the atomization air 56 and liquid fuel will cause the fuel to break up to form liquid fuel droplets 58 projected from nozzle 50 into the preliminary prevaporizing premixing chamber 44 generally co-axial with the longitudinal axis 23 and in a direction toward the final prevaporizing premixing chamber 48. It is also noted that the atomization assist gas for the liquid fuel nozzle 50 can either be air or a gaseous fuel. Particularly, a low quality gaseous fuel may be advantageously utilized as atomization assist gas to the liquid fuel nozzle 50.

The design of the nozzle 50 is preferably selected such that a spray angle 60 of the spray of liquid fuel droplets 58 is such that a minimal number of liquid fuel droplets hit the hot inner wall surface 62 of chamber wall 42 of preliminary prevaporizing premixing chamber 44 in order to avoid coking of the liquid fuel on the chamber wall 42.

It is noted that although the fuel injection nozzle 50 is shown as a single liquid fuel inlet located axially within the fuel injector, it is within the broader scope of the present disclosure to utilize multiple liquid fuel inlets which need not be axially located.

The fuel injector apparatus 10 is designed to provide the capability of handling liquid fuel via nozzle 50 and also one or more sources of gaseous fuel, either alternatively or simultaneously. To that end, injector apparatus 10 includes first and second gaseous fuel inlets 64 and 66, respectively, for supplying gaseous fuels via first and second gas supply lines 68 and 70, respectively.

In the preliminary prevaporizing and premixing stage 24, high temperature combustion air 36 from air supply passage 34 flows through a plurality of openings 72 which may be referred to as preliminary air inlets 72 defined through the chamber wall 42. The combustion air 36 flowing through openings 72 flows transversely to axis 23. The combustion air flowing through preliminary air inlets 72 provides the required energy to at least partially vaporize the atomized liquid fuel droplets 58. The amount of combustion air 36 flowing through preliminary air inlets 72 is controlled by the design of the inlets 72 such that the resulting fuel and air mixture in the preliminary prevaporizing premixing chamber 44 cannot autoignite. Air inlets 72 are preferably located downstream of nozzle 50. The geometry of the preliminary air inlets 72, including the total area, shape and locations of those inlets is selected to provide the desired amount of combustion air and to define the desired flow pattern within preliminary prevaporizing premixing chamber 44 to vaporize the liquid fuel droplets 58 and premix the vaporized fuel with the combustion air.

After a residence time required for the fuel and air mixture to flow through the preliminary prevaporizing premixing chamber 44, the prevaporized and premixed fuel and air mixture 74 flows through distribution holes 76 in the first flow distributor 30 into the intermediate prevaporizing premixing chamber 46. In an embodiment the first flow distributor 30 may be a simple perforated plate with evenly distributed distribution holes 76.

In other embodiments, as seen for example in FIGS. 7 and 8, the flow pattern of fuel and air mixture resulting from the design of the preliminary prevaporizing and premixing stage 24 may be such that the first flow distributor 30 may be eliminated.

It is desired that when the fuel and air mixture enters the final prevaporizing premixing chamber 48, that the liquid fuel be substantially fully vaporized. To that end, if the fuel and air mixture 74 leaving the preliminary prevaporizing premixing chamber 44 is not adequately prevaporized, the intermediate prevaporizing and premixing stage 26 may be provided. In the intermediate prevaporizing premixing chamber 46 additional hot combustion air 36 from combustion air supply passage 34 is introduced into intermediate chamber 46 via intermediate air inlets 78 to further vaporize the liquid fuel droplets flowing through the intermediate prevaporizing premixing chamber 46. Again, in the intermediate stage 26, the fuel and air mixture is controlled such that the fuel and air mixture cannot autoignite and the temperature of the mixture is controlled to avoid liquid fuel coking within intermediate chamber 46.

As the fuel and air mixture flows into the final prevaporizing and premixing stage 28, the flow is split into a pilot flow stream 80 and a final stage flow stream 82 by second flow distributor 32.

The second flow distributor 32 has a central hole 84 therethrough within which is received a pilot tube 86. The pilot tube 86 is attached to the second distributor 32 and extends axially through the length of the final prevaporizing premixing stage 28. The pilot tube outlet 18 communicates the pilot flow stream 80 with the combustion chamber 40.

The final stage flow stream 82 flows through a plurality of distribution holes 88 in second distributor 32 into the annular area of final stage 28 between the pilot tube 86 and the chamber wall 42.

It is noted that the pilot flow stream 80 flows through the pilot tube 86 directly into the combustion zone 40 without being further diluted by additional combustion air. The final stage flow stream 82, however, which passes through distributor openings 88 into the final prevaporizing premixing chamber 48 will be further mixed with additional combustion air 36 entering a plurality of final air inlets 90 to further reduce the fuel to air ratio of the final stage flow stream 82 and to further premix the fuel and air of final stage flow stream 82. It is also noted that to the extent the liquid fuel droplets have not been fully vaporized prior to entering the final prevaporizing premixing chamber 48, further prevaporization of liquid fuel droplets will occur. It will be appreciated that although it is preferred that the liquid fuel droplets be substantially fully vaporized prior to entering the final prevaporizing premixing chamber 48, to the extent the liquid fuel droplets are not fully prevaporized, they will be further prevaporized in the final chamber 48. Thus the final chamber 48 may be referred to either as a final prevaporizing premixing chamber 48 or simply as a final premixing chamber 48, and in either event it is understood that some additional prevaporization of fuel may occur in the final chamber 48.

Additionally, and optionally, additional combustion air 36 may enter the final chamber through a plurality of swirling slots 92 defined through the chamber wall 42. The size, location and geometry of the final air inlets 90 and/or the swirling slots 92 is selected depending upon the desired flow pattern and fuel and air mixing levels, and also dependent upon the geometry of the downstream combustion chamber 40. The goal is to provide a uniform fuel and air distribution at the final chamber fuel outlet 16 into the combustion chamber 40.

As a result of the additional combustion air provided to the final stage flow stream 82 in final chamber 48 via openings 90 and/or 92, the pilot flow stream 80 exiting pilot tube 86 will have a higher fuel to air ratio than will the final stage flow stream 82 exiting outlet 16, while the final stage flow stream 82 will tend to be more uniformly mixed and will have a lower fuel concentration.

The pilot tube 86 provides a substantially different operation than do conventional pilot tubes utilized in liquid fuel injectors. In a traditional injector a pilot tube is sometimes used to supply 100% fuel to a combustion chamber in order to provide combustion stability at the outlet of the pilot tube. The present design, however, provides a much leaner "premixed piloting" which achieves both a good flame stability, while maintaining lower NOx emissions than does a traditional pilot.

Additionally, and optionally, at the distal tip of pilot tube 86 a bluff body 94 may be utilized to create a recirculation zone 95 downstream thereof to further enhance combustion stability of a pilot flame exiting the pilot tube exit 18. Additionally, due to the restrictive effect of the bluff body 94 which reduces the cross-sectional area of the annular space between pilot tube 86 and annular chamber wall 42, the flow velocity of the final stage flow stream 82 is increased just as it exits through final stage outlet 16. This reduces any tendency for flashback of the flame from final stage flow stream 82. The bluff body 94 may include a plurality of small openings 96 appropriately sized and situated to adjust the recirculation flow downstream of bluff body 94 so as to provide the desired stabilization of the pilot flame.

Alternative Embodiments of FIGS. 7 and 8

FIG. 7 depicts an alternative embodiment of the fuel injector apparatus 10 of FIG. 1, in which the first flow distributor plate 30 and the intermediate stage 26 have been eliminated. The embodiment of FIG. 7 is designated by the numeral 10A. It is noted that the air inlets 78 which were associated with the intermediate chamber 26 may be retained or eliminated as desired.

FIG. 8 shows another alternative embodiment designated by the numeral 10B. The fuel injector apparatus 10B illustrates several modifications. First, the flow divider 30 and intermediate chamber 26 have been eliminated as was the case in the embodiment of FIG. 7. The pilot tube 18 has also been eliminated, and the flow distributor 32A between the primary stage 24 and final stage 28 has been modified to be a simple perforated plate.

Additionally, in the fuel injector apparatus 10B of FIG. 8, an outlet end portion 200 of inner tube 28 converges toward the outlet end 16 so that the cross-sectional area of the final chamber 48 adjacent the outlet end 16 is of decreasing cross-sectional area.

In general, it is noted that the inner tube 20 preferably is either of a straight wall construction as seen in the embodiments of FIGS. 1 and 7, or of a converging wall construction as seen in the embodiment of FIG. 8, but preferably does not have a diverging construction in the direction of the outlet end 16.

Multiple Fuel Capabilities and the Ability to Utilize Low Quality Fuel

The fuel injectors 10, 10A and 10B of FIGS. 1, 7 and 8 are particularly well adapted for the use of multiple fuel sources simultaneously. Further, each of the embodiments is capable of utilizing low quality fuel by mixing the low quality fuel with a higher quality fuel and still achieving superior combustion performance.

Thus, for example, a high quality liquid fuel may be provided to the liquid fuel nozzle 50 while one or more low quality gaseous fuels may be provided to gaseous fuel inlets 68 and 70. The back pressure provided in the preliminary prevaporizing premixing chamber 44 and/or the intermediate prevaporizing premixing chamber 46 by the flow distributors such as 30 and/or 32 increases the residence time in those chambers. This allows the two fuels and the air to be thoroughly mixed while the liquid fuel is being vaporized so that the fuel and air mixture reaching the final chamber 48 is sufficiently thoroughly mixed that the lower quality fuel component can be combusted in the combustion chamber 40. Thus combustion stability can be maintained even when utilizing low quality fuels as a portion of the fuel source.

Similarly, the apparatus 10, 10A and 10B may be utilized to burn multiple liquid fuel sources and/or multiple gaseous fuel sources, wherein one of those sources is of a fuel of the type which taken alone would not be suitable for fueling a microturbine or other engine.

The design of fuel injector 10 is capable of combusting both gaseous and liquid fuels. The design aims to improve combustion performance by improving:

(1) liquid fuel premixed atomization and premixing quality;

(2) flame stability in the combustion chamber 40;

(3) prevention of flashback;

(4) multi-fuel capability which means using one or more fuels independently;

(5) the ability to switch between different fuels including but not limited to while the system is operating;

(6) the ability to simultaneously use more than one fuel or input stream;

(7) the ability to extend fuel flexibility, that is to broaden the range of fuels or input streams that may be consumed;

(8) the ability to mix and consume multiple input or fuel streams within a gas turbine, thus avoiding external mixing methods;

(9) the ability to enhance one input fuel stream's combustion properties or attributes by mixing with another fuel stream;

(10) the provision of multi-stage fuel preparation in a compact form;

(11) the provision of a method by which one input stream may be destroyed using another;

(12) the ability to use fuel or input streams of different phases such as a liquid and a gaseous input stream;

(13) the ability to burn liquid or gaseous stream with suspended solids; and

(14) the ability to control the amount of fuel piloting in a premix system.

This design of injector 10 may potentially solve many problems often encountered with lean prevaporized premixed injectors, including:

(1) improving multi-fuel capability of an injector;

(2) improving liquid fuel premixing, prevaporization quality;

(3) reducing liquid fuel tube coking;

(4) lowering NOx emissions;

(5) lowering CO emissions;

(6) lowering THC or VOC emissions;

(7) lowering particulate emissions;

(8) improving power by improving combustor exit temperature pattern and profile;

(9) improving efficiency by improving combustor exit temperature pattern and profile;

(10) utilizing low quality fuel which would otherwise go unused;

(11) utilizing low quality fuel not easily used by other turbines or types of engines;

(12) improving emissions especially, including under difficult cold start situations;

(13) reducing multiple-stream mixing problems;

(14) improving tolerance to fuel contamination such as the passage of solids;

(15) extending range of low BTU gases which can be burned as fuel;

(16) providing the ability to burn MBTU or LBTU gases as digesters or landfills age without requiring a replacement of injector types;

(17) improving ability to burns fuels which are normally hard to keep in one phase, including propane, butane, naphtha, kerosene, dme, ethanol and other bio-derived fuels;

(18) improving combustion stability range;

(19) improving flashback margin and prevention;

(20) improving tolerance to acoustic interactions;

(21) improving injector life and durability;

(22) allowing the use of lower cost injector materials instead of high temperature alloys;

(23) due to its fuel flexibility, allowing a lower part count across product lines and improving inventory management and inventory turns;

(24) simplifying the injector manufacturing process;

(25) simplifying and improving field serviceability since normal replacement items may not require the injector to be removed to be serviced or may prevent the entire injector from being replaced;

(26) improving ability to refurbish and remanufacture returned injectors;

(27) providing modular design allowing for easy customization if necessary;

(28) providing modular design allowing some common components to be used across a wide range of product platforms;

(29) lowering non-recurring engineering costs typically associated with complex injector design by separating necessary physical processes such as atomization, vaporization and mixing within modular injector sub-components; and

(30) avoiding wall wetting at the injector exit into the combustor.

This design of injector 10 provides a number of advantages, including:

(1) providing multi-fuel capability;

(2) providing multiple premixing chambers;

(3) providing multiple prevaporizing chambers;

(4) providing capability to have a controllable fuel pilot and partial piloting in addition to full premixing operation;

(5) providing improved capability to change liquid nozzles; and (6) providing one single source of air of the same temperature, such as hot combustion air (post compressor/recuperator), to vaporize liquid fuel droplets.

Use of Fuel Injector in a Turbogenerator

Referring now to FIGS. 2-6, the general construction of a typical turbogenerator in which the fuel injector apparatus 10 may be utilized, and the manner in which the fuel injector apparatus 10 would be assembled with the turbogenerator is shown. It is noted that the alternative injectors 10A and 10B may also be used in place of injector 10.

Figure 2:
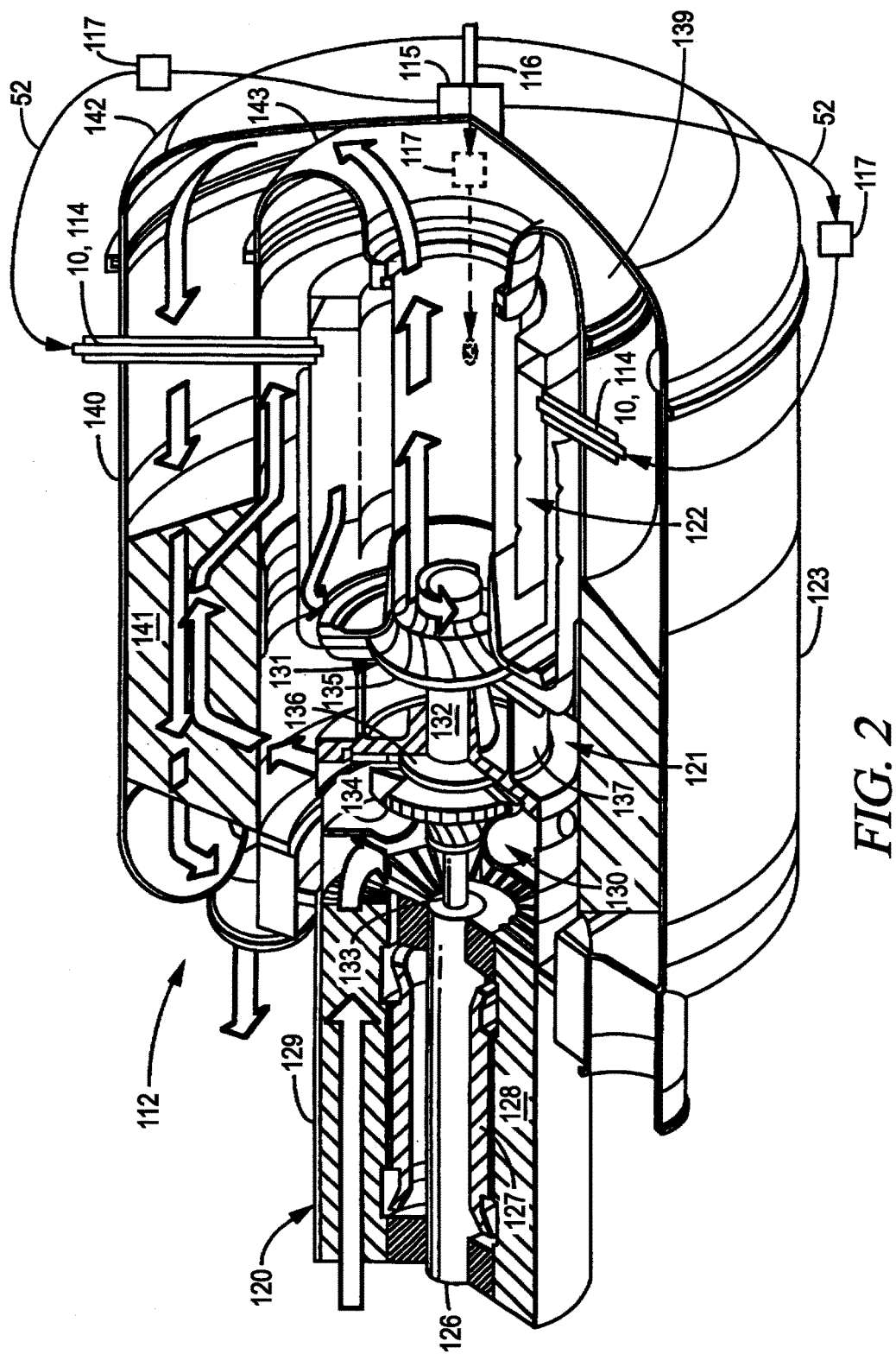
FIG. 2 is a perspective, partially cutaway view, of a turbogenerator utilizing the fuel injector of FIG. 1.

A turbogenerator 112 utilizing the fuel injector 10 and the low emissions combustion system of the present invention is illustrated in FIG. 2. The turbogenerator 112 generally comprises a permanent magnet generator 120, a power head 121, a combustor 122 and a recuperator (or heat exchanger) 123.

The permanent magnet generator 120 includes a permanent magnet rotor or sleeve 126, having a permanent magnet disposed therein, rotatably supported within a permanent magnet stator 127 by a pair of spaced journal bearings. Radial permanent magnet stator cooling fins 128 are enclosed in an outer cylindrical sleeve 129 to form an annular air flow passage which cools the permanent magnet stator 127 and thereby preheats the air passing through on its way to the power head 121.

The power head 121 of the turbogenerator 112 includes compressor 130, turbine 131, and bearing rotor 132 through which the tie rod 133 to the permanent magnet rotor 126 passes. The compressor 130, having compressor impeller or wheel 134 which receives preheated air from the annular air flow passage in cylindrical sleeve 129 around the permanent magnet stator 127, is driven by the turbine 131 having turbine wheel 135 which receives heated exhaust gases from the combustor 122 supplied with preheated air from recuperator 123. The compressor wheel 134 and turbine wheel 135 are supported on a bearing shaft or rotor 132 having a radially extending bearing rotor thrust disk 136. The bearing rotor 132 is rotatably supported by a single journal bearing within the center bearing housing 137 while the bearing rotor thrust disk 136 at the compressor end of the bearing rotor 132 is rotatably supported by a bilateral thrust bearing.

Intake air is drawn through the permanent magnet generator 120 by the compressor 130 which increases the pressure of the air and forces it into the recuperator 123. The recuperator 123 includes an annular housing 140 having a heat transfer section 141, an exhaust gas dome 142 and a combustor dome 143. Exhaust heat from the turbine 131 is used to preheat the air before it enters the combustor 122 where the preheated air is mixed with fuel and burned. The combustion gases are then expanded in the turbine 131 which drives the compressor 130 and the permanent magnet rotor 126 of the permanent magnet generator 120 which is mounted on the same shaft as the turbine 131. The expanded turbine exhaust gases are then passed through the recuperator 123 before being discharged from the turbogenerator 112.

Figure 4:
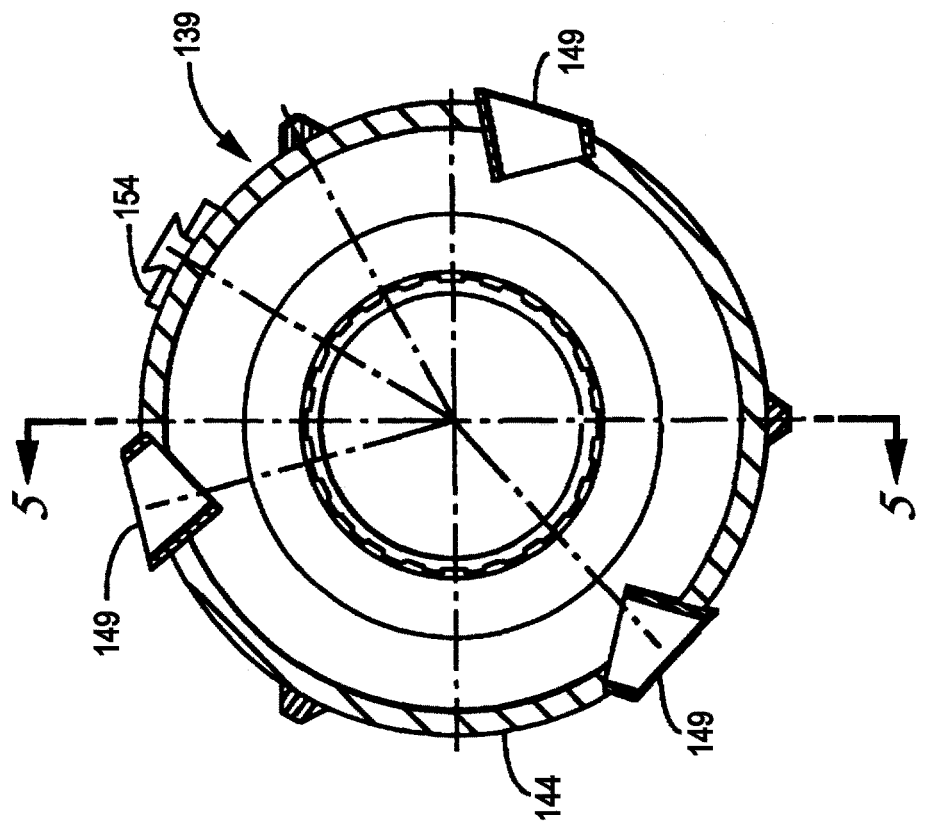
FIG. 4 is a sectional view of the combustor housing of FIG. 3 taken along line 4-4 of FIG. 3.
Figure 3:
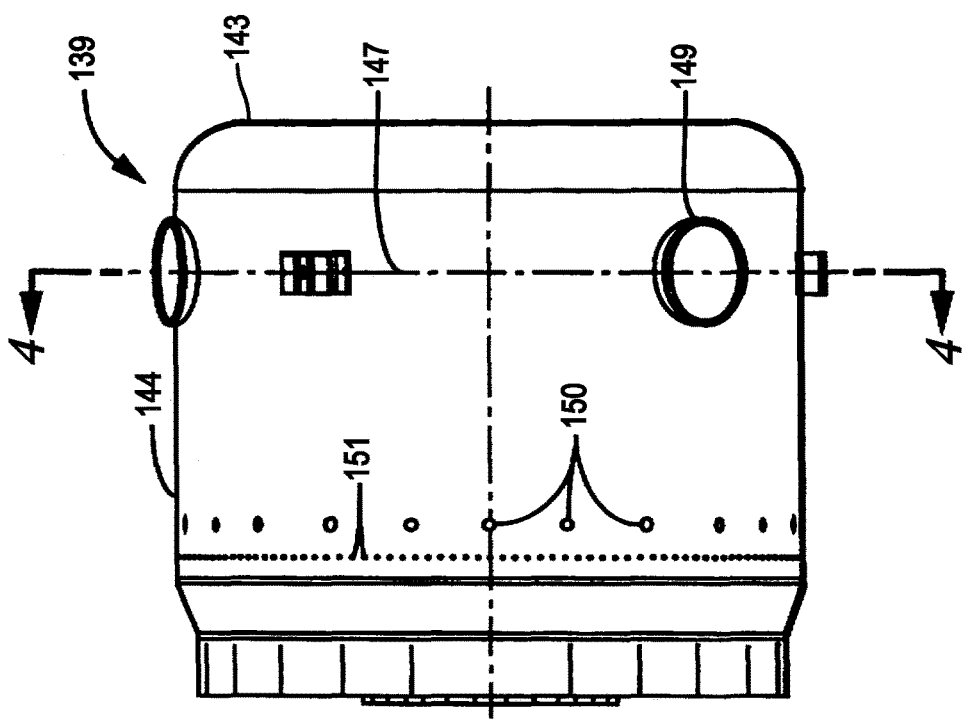
FIG. 3 is a plan view of a combustor housing for the turbogenerator of FIG. 2.
Figure 5:
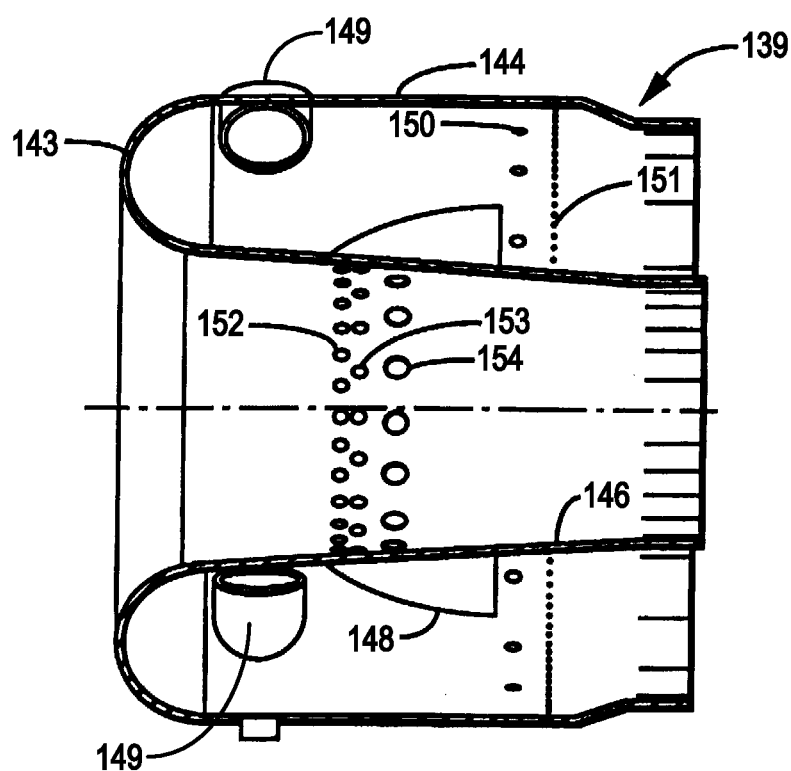
FIG. 5 is a sectional view of the combustor housing of FIG. 4 taken along line 5-5 of FIG. 4.

The combustor housing 139 of the combustor 122 is illustrated in FIGS. 3-5, and generally comprises a cylindrical outer liner 144 and a tapered inner liner 146 which, together with the combustor dome 143, form a generally expanding annular combustion housing or chamber 139 from the combustor dome 143 to the turbine 131. A plurality of fuel injector guides 149 (shown as three) position the fuel injectors 10, 114 to tangentially introduce a fuel/air mixture at the combustor dome 143 end of the annular combustion housing 139 along the fuel injector axis or centerline 147. This same centerline 147 includes an ignitor cap 154 to position an ignitor (not shown) within the combustor housing 139. The combustion dome 143 is rounded out to permit the swirl pattern from the fuel injectors 10, 114 to fully develop and also to reduce structural stress loads in the combustor. It will be understood that the fuel injectors 10, 114 are preferably constructed in a manner like that described above for fuel injector 10 of FIG. 1, or the injectors 10A or 10B shown in FIGS. 7 and 8.

A flow control baffle 148 extends from the tapered inner liner 146 into the annular combustion housing 139. The baffle 148, which would be generally skirt-shaped, would extend between one-third and one-half of the distance between the tapered inner liner 146 and the cylindrical outer liner 144. Three rows each of a plurality of spaced offset air dilution holes 152, 153, and 154 in the tapered inner liner 146 underneath the flow control baffle 148 introduce dilution air into the annular combustion housing 139. The first two (2) rows of air dilution holes 152 and 153 (closest to the fuel injector centerline 147) may be the same size with both, however, smaller than the third row of air dilution holes 154.

In addition, two (2) rows each of a plurality of spaced air dilution holes 150 and 151 in the cylindrical outer liner 144, introduce more dilution air downstream from the flow control baffle 148. The plurality of holes 150 closest to the flow control baffle 148 may be larger and less numerous than the second row of holes 151.

Liquid fuel can be provided individually to each fuel injector 10, 114, or, as shown in FIG. 2, a liquid fuel manifold 115 can be used to supply liquid fuel to all three (3) fuel injectors 10, 114. The liquid fuel manifold 115 includes a liquid fuel inlet 116 to receive fuel from a fuel source (not shown). Flow control valves 117 are provided in each of the fuel lines 52 from the manifold 115 to the fuel injectors 10, 114. In order to sustain low power operation, maintain fuel economy and low emissions, the flow control valves 117 can be individually controlled to an on/off position (to separately use any combination of fuel injectors individually) or they can be modulated together. The flow control valves 117 can be opened by fuel pressure or their operation can be controlled or augmented with a solenoid.

Figure 6:
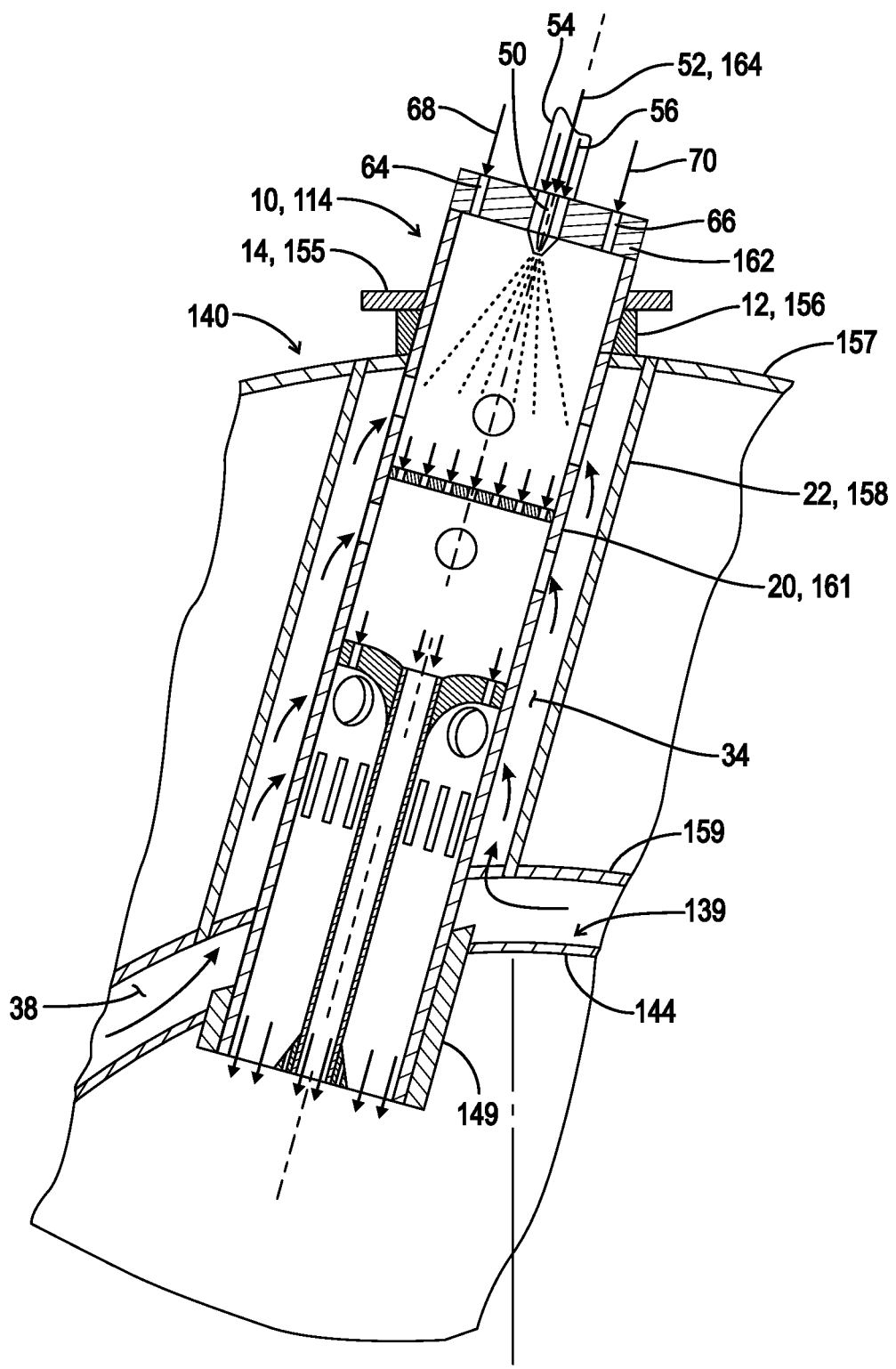
FIG. 6 is an enlarged schematic sectional view of a modified version of the fuel injector of FIG. 1 in place within the turbogenerator of FIG. 2.

FIG. 6 schematically illustrates the fuel injector 10, 114 extending through the recuperator housing 140 and into the combustor housing 139 through a fuel injector guide 149. The fuel injector flange 14, 155 is attached to the boss 12, 156 on the outer recuperator wall 157 and extends through an angled tube 22, 158 between the outer recuperator wall 157 and the inner recuperator wall 159. The fuel injector 10, 114 extends through the fuel injector guide 149 in the cylindrical outer liner 144 of the combustor housing 139 into the interior of the annular combustion housing 139.

The fuel injectors 10, 114 generally comprise an injector tube 20, 161 having an inlet end and a discharge end. The inlet end of the injector tube 20, 161 includes a coupler 162 having a fuel inlet tube 52, 164 which provides fuel to the injector tube 20, 161.

The space 34 between the angled tube 22, 158 and the injector tube 20, 161 is open to a space 38 between the inner recuperator wall 159 and the cylindrical outer liner 144 of the combustor housing 139. The space 38 may be the common combustion air source 38 previously noted with regard to FIG. 1. Heated compressed air from the recuperator 123 is supplied to the space 38 between the inner recuperator wall 159 and the cylindrical outer liner 144 of the combustor housing 139 and is thus available to the annular space 34 interior of the angled tube 22, 158.

Thus it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art which changes are encompassed within the scope and spirit of the present invention as defined by the appended claims.

What is claimed is:

1. A multistaged lean prevaporizing premixing fuel injector apparatus, comprising:
   a preliminary prevaporizing premixing chamber having an injector inlet end and having a central longitudinal axis;
   a final premixing chamber communicated with the preliminary prevaporizing premixing chamber and having an injector outlet end;
   an annular chamber wall defining the final premixing chamber within the chamber wall;
   an annular flow distributor connected to the chamber wall, the flow distributor having a plurality of distributor openings therethrough for distributing flow of fuel and air mixture from upstream of the annular flow distributor into the final premixing chamber;
   a pilot tube oriented concentrically with the chamber wall and extending from the annular flow distributor through the final premixing chamber for diverting a pilot stream portion of a fuel and air mixture from upstream of the annular flow distributor to the injector outlet end, the pilot tube including a pilot tube passage extending along the central longitudinal axis from a pilot tube inlet to a pilot tube outlet, the pilot tube passage being separate from the distributor openings, the final premixing chamber being an annular chamber defined between the chamber wall and the pilot tube;

a liquid fuel nozzle arranged to spray a liquid fuel into the preliminary prevaporizing premixing chamber and toward the final premixing chamber;

a preliminary air inlet communicated with the preliminary prevaporizing premixing chamber for communicating preliminary combustion air to the preliminary prevaporizing premixing chamber; and a final air inlet communicated with the final premixing chamber for communicating final combustion air to the final premixing chamber, the final air inlet being located downstream of the pilot tube inlet so that a fuel and air mixture exiting from the pilot tube has a higher fuel to air ratio than does a fuel and air mixture exiting the final premixing chamber.

2. The fuel injector apparatus of claim 1, wherein:

the preliminary prevaporizing premixing chamber, the final premixing chamber, the liquid fuel nozzle and the pilot tube are all co-axially oriented about the central longitudinal axis.

3. The fuel injector of claim 1, wherein:

the final air inlet is one of a plurality of final air inlets defined through the chamber wall downstream of the flow distributor.

4. The fuel injector apparatus of claim 1, further comprising:

a bluff body connected to the pilot tube adjacent the injector outlet end and extending radially outward from the pilot tube to reduce a cross-sectional area of the final premixing chamber adjacent the injector outlet end, so that an exit velocity of fuel and air mixture from the final premixing chamber is increased.

5. The fuel injector apparatus of claim 4, wherein:

the bluff body is configured to create a recirculation zone downstream of the bluff body and to thereby improve flame stability of a pilot flame exiting the pilot tube.

6. The fuel injector apparatus of claim 1, further comprising:

a common air supply passage communicated with both the preliminary air inlet and the final air inlet for communicating a common combustion air source to both the preliminary prevaporizing premixing chamber and the final premixing chamber at substantially the same temperature.

7. The fuel injector apparatus of claim 6, in combination with a microturbine having an inlet air compressor and having a recuperator for using microturbine exhaust gas to preheat compressed air from the compressor prior to directing the preheated compressed air to a combustor of the microturbine, wherein:

the common air supply passage is communicated with the recuperator to provide preheated compressed air from the recuperator to both the preliminary air inlet and the final air inlet at a temperature above about 900° F.

8. The fuel injector apparatus of claim 6, further comprising:

an annular outer wall concentrically disposed about the annular chamber wall, so that an annular passage is defined between the outer wall and the chamber wall, the annular passage comprising at least a portion of the common air supply passage.

9. The fuel injector apparatus of claim 6, further comprising:

an intermediate prevaporizing premixing chamber located between the preliminary prevaporizing premixing chamber and the final premixing chamber, and having an intermediate air inlet for introducing air from the common air supply passage into the intermediate prevaporizing premixing chamber.

10. The fuel injector apparatus of claim 9, further comprising:

a flow distributor located between the preliminary and intermediate prevaporizing premixing chambers for distributing fuel and air mixture from the preliminary prevaporizing premixing chamber across a cross-section of the intermediate prevaporizing premixing chamber.

11. The fuel injector apparatus of claim 1, further comprising:

one or more gaseous fuel inlets communicated with the preliminary prevaporizing premixing chamber.

12. The fuel injector apparatus of claim 1, wherein:

the pilot tube extends all the way to the injector outlet end.

* * * * *